(12) United States Patent
Kogure et al.

(10) Patent No.: US 9,925,852 B2
(45) Date of Patent: Mar. 27, 2018

(54) WIRE HARNESS WINDING DEVICE

(71) Applicant: YAZAKI CORPORATION, Tokyo (JP)

(72) Inventors: Naoto Kogure, Shizuoka (JP); Masataka Nishijima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 121 days.

(21) Appl. No.: 15/225,575

(22) Filed: Aug. 1, 2016

(65) Prior Publication Data

US 2017/0036522 A1 Feb. 9, 2017

(30) Foreign Application Priority Data

Aug. 4, 2015 (JP) ................... 2015-154087

(51) Int. Cl.
| | |
|---|---|
| *B60J 5/06* | (2006.01) |
| *H02G 11/02* | (2006.01) |
| *B60R 16/02* | (2006.01) |
| *E05F 15/632* | (2015.01) |

(52) U.S. Cl.
CPC ............. *B60J 5/06* (2013.01); *B60R 16/0215* (2013.01); *E05F 15/632* (2015.01); *H02G 11/02* (2013.01); *E05Y 2400/65* (2013.01); *E05Y 2400/654* (2013.01)

(58) Field of Classification Search
CPC ....... B01J 5/06; E05F 15/632; B60R 16/0215; H02G 11/02
See application file for complete search history.

(56) References Cited

U.S. PATENT DOCUMENTS

| | | | | |
|---|---|---|---|---|
| 9,670,708 | B2 * | 6/2017 | Tsubaki | .................. E05D 15/28 |
| 2011/0114779 | A1 * | 5/2011 | Tsubaki | .............. B60R 16/0215 |
| | | | | 242/372 |
| 2013/0248632 | A1 * | 9/2013 | Hamada | ............... H01R 35/025 |
| | | | | 242/371 |
| 2015/0001327 | A1 * | 1/2015 | Hamada | ................. B65H 75/44 |
| | | | | 242/376 |
| 2016/0013627 | A1 * | 1/2016 | Katsuramaki | .......... B65H 75/28 |
| | | | | 242/377 |
| 2017/0294767 | A1 * | 10/2017 | Sano | ................... B60R 16/0215 |

FOREIGN PATENT DOCUMENTS

JP        2008-30716 A    2/2008

* cited by examiner

*Primary Examiner* — Sang K Kim
(74) *Attorney, Agent, or Firm* — Kenealy Viadya LLP

(57) ABSTRACT

A wire harness winding device includes a fixing member and a tubular winding member. The surrounding wall of the winding member is provided with wire harness insertion portions at an interval in a circumferential direction. The wire harnesses are individually inserted with excess lengths in the wire harness insertion portions, and other ends are led out to an outside of the winding member. When the wire harnesses are at a first position of a winding position at which the wire harnesses are wound by the winding member and a leading position at which the wire harnesses are led from the winding member, a portion of the excess length is wound by the fixing member. When the wire harnesses are at a second position of the winding position and the leading position, the portion of the excess length is slacked between the fixing member and the winding member.

7 Claims, 11 Drawing Sheets

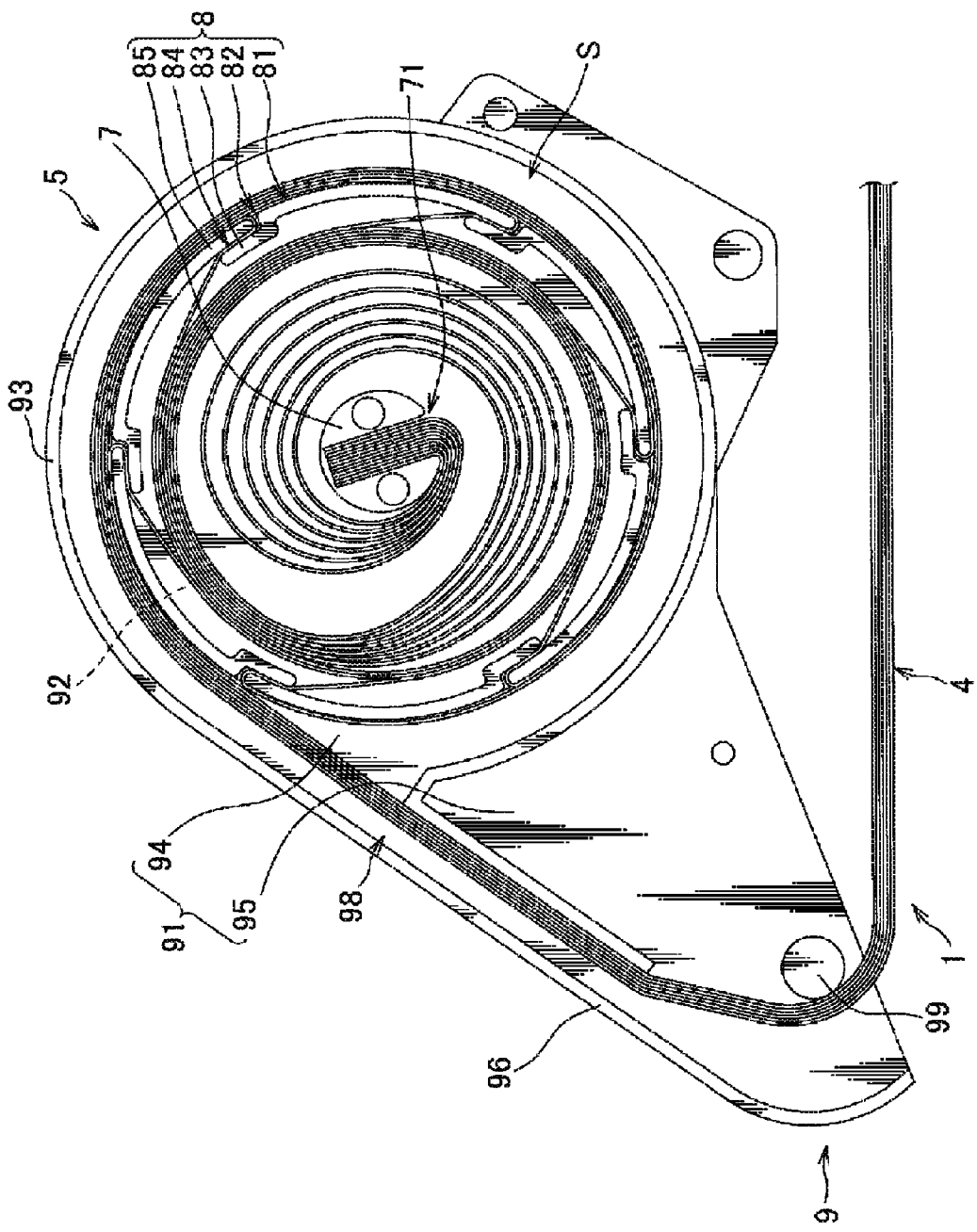

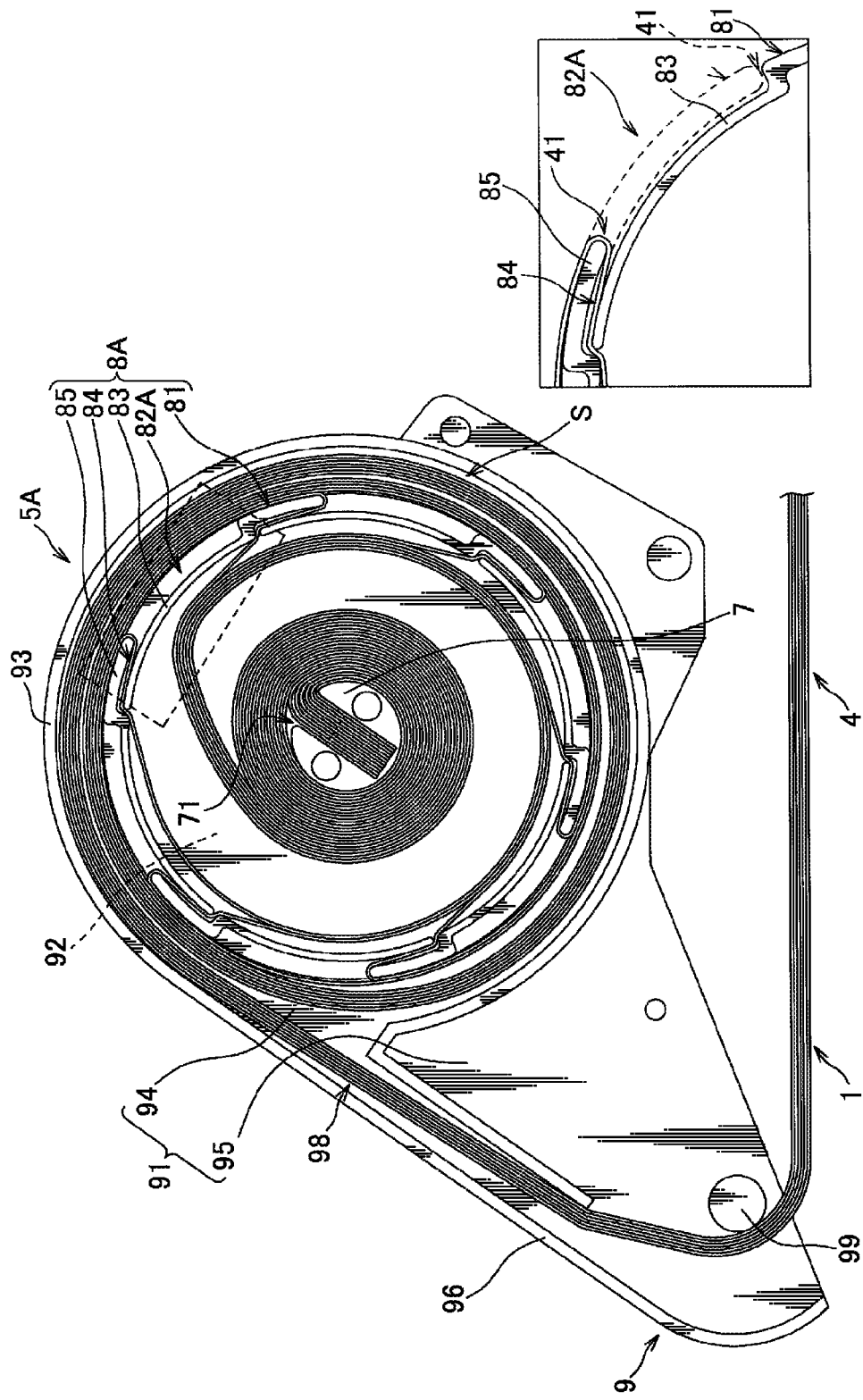

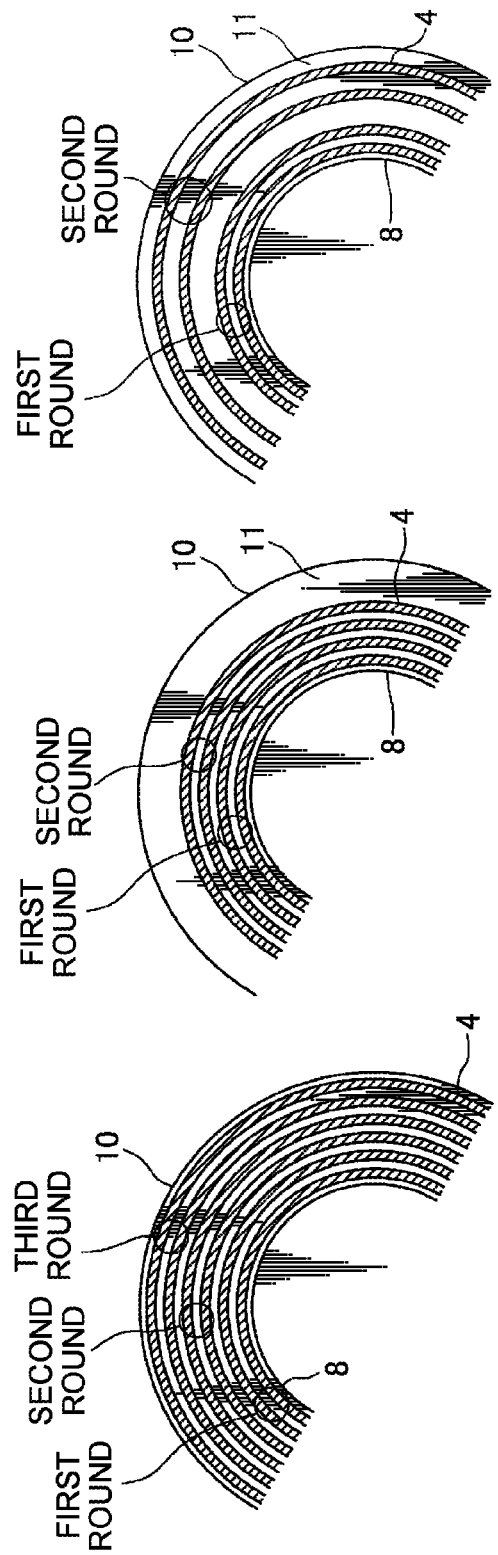

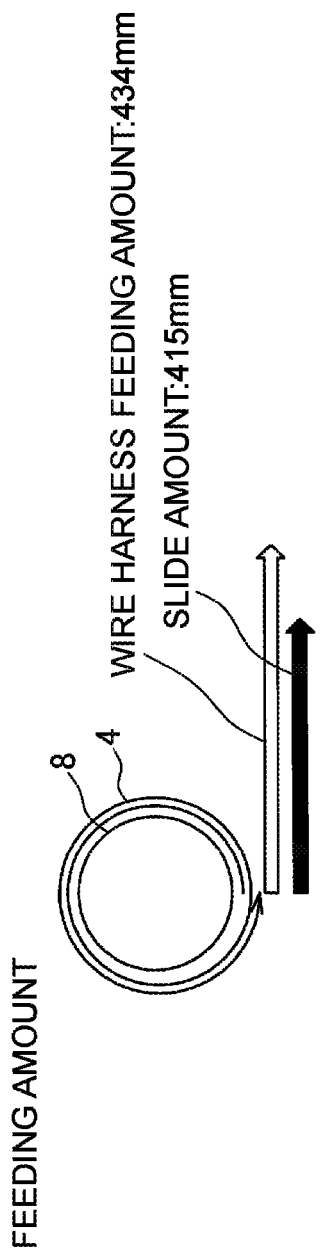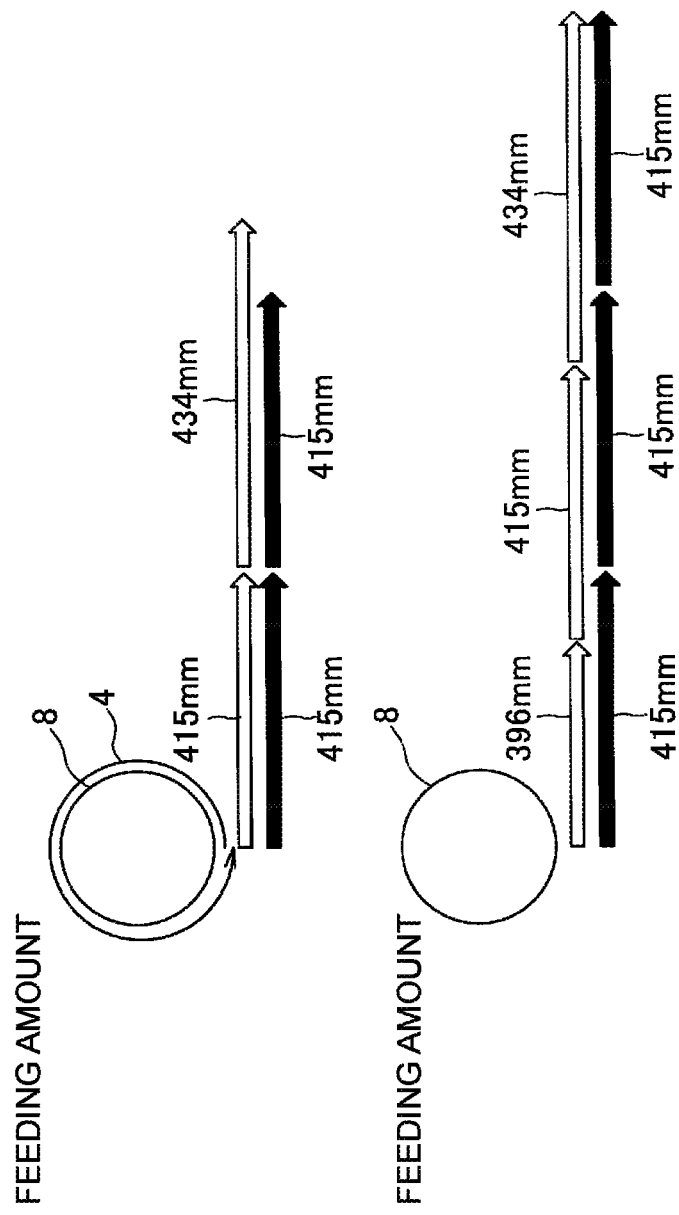

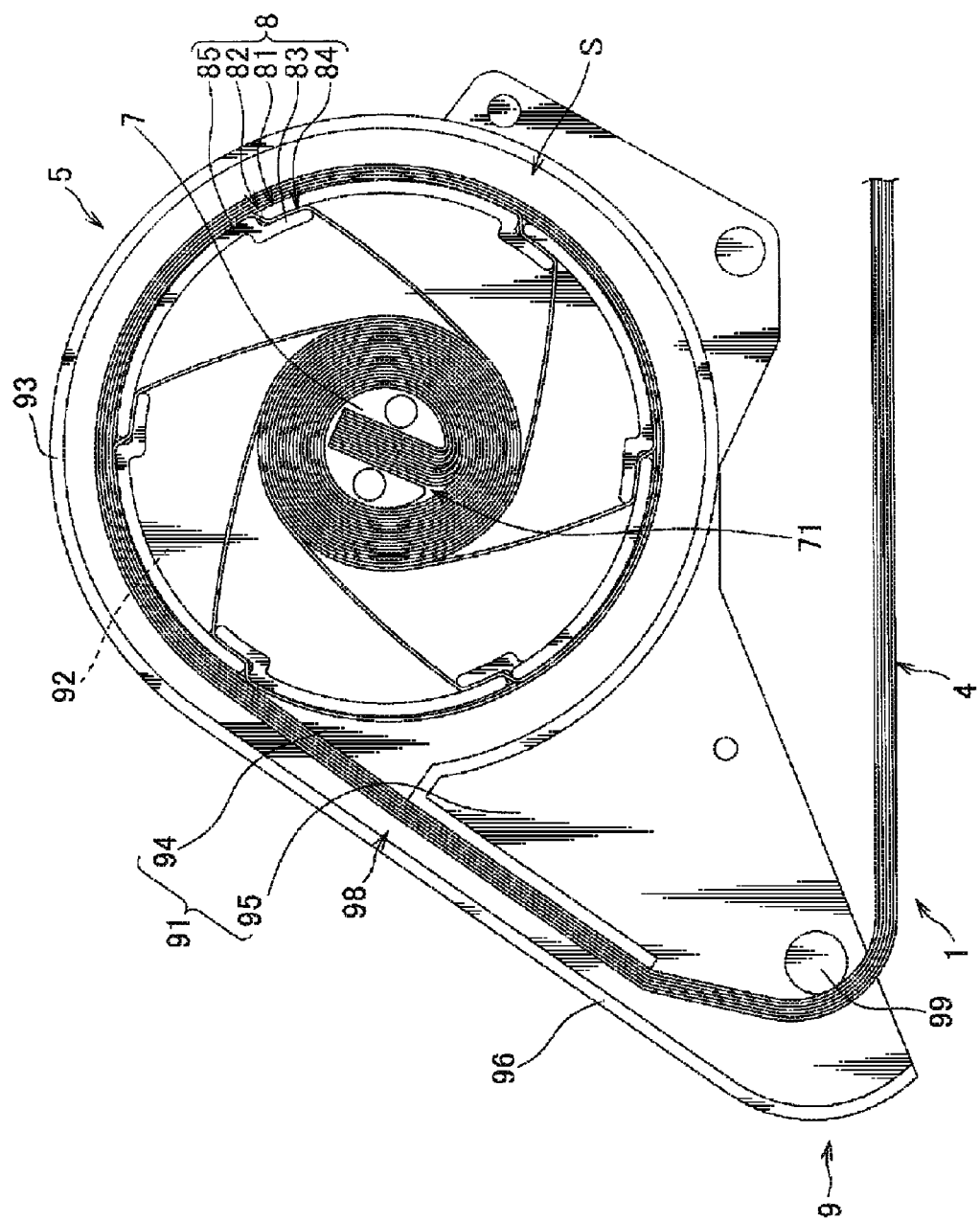

WIRE HARNESS WINDING DEVICE

BACKGROUND

Technical Field

The present invention relates to a wire harness winding device.

Related Art

In slide doors used in minivans and wagons, electrical components such as power window motors are embedded. To feed power to these electrical components, it is necessary to provide wire harnesses (wiring body) from a vehicle body to a slide door, and to make the wire harnesses to follow opening and closing of the slide door.

FIG. 11A shows one form of a conventional slide door power feeding device, and FIG. 11B is an exploded view of an excess length winding portion 10 provided to this slide door power feeding device (see Patent Literature 1). This slide door power feeding device includes the excess length winding portion 10 in the vehicle body, and absorbs an excess length of the wiring body 30 which is left when a slide door 50 (bracket 51) is opened or closed, by winding the wiring body 30.

Patent Literature 1: JP 2008-030716 A

SUMMARY

However, the excess length winding portion 10 of the slide door power feeding device disclosed in JP 2008-030716 A includes a plurality of components including a rotor 13 which winds and houses an excess length portion of the wiring body 30, a torsion spring 14 which applies a rotation force to the rotor 13, and adds a tensile force to the wiring body 30, and a lower case 15 which houses the torsion spring 14, and the number of parts which are excess lengths winding portions is large. Further, the large number of parts causes a problem of an increase in cost and weight of the entire slide door power feeding device.

Furthermore, the excess length winding portion 10 disclosed in Patent Literature 1 is likely to accelerate deterioration of wire harnesses since a plurality of wiring bodies 30 rubs against the wiring bodies 30 when the wiring bodies 30 are wound and led.

An object of the present invention is to provide a wire harness winding device which hardly applies a burden to wire harnesses when winding or leading the wire harnesses.

A wire harness winding device according to an embodiment of the present invention includes: a fixing member to which one ends of a plurality of wire harnesses are fixed; and a winding member of a tubular shape which is formed coaxially with the fixing member, and is able to wind the plurality of wire harnesses on a circumferential surface thereof, wherein the circumferential surface of the winding member is provided with a plurality of wire harness insertion portions at an interval in a circumferential direction, the plurality of wire harnesses is individually inserted with an excess length in the plurality of wire harness insertion portions, and other ends are led out to an outside of the winding member, and when the plurality of wire harnesses is at a first position of a winding position at which the plurality of wire harnesses is wound by the winding member and a leading position at which the plurality of wire harnesses is led from the winding member, a portion of the excess length is wound by the fixing member, and, when the plurality of wire harnesses is at a second position of the winding position and the leading position, the portion of the excess length is slacked between the fixing member and the winding member.

There is an aspect of the present invention, wherein, when the plurality of wire harnesses moves from the winding position to the leading position, the winding member rotates in a direction opposite to a winding direction in which the portion of the excess length is wound by the fixing member, and the portion of the excess length wound by the fixing member is slacked between the fixing member and the winding member.

There is another aspect of the present invention, wherein, when the plurality of wire harnesses moves from the winding position to the leading position, the winding member rotates in a direction identical to a winding direction in which the portion of the excess length is wound by the fixing member, and the portion of the excess length slacked between the fixing member and the winding member is wound by the fixing member.

The present invention preferably includes a housing portion of a cylindrical shape which is vertically provided opposing to the circumferential surface and in which the plurality of wire harnesses is housed between the circumferential surface of the winding member and the housing portion, and, in this case, the housing portion is preferably provided at an interval from the wire harnesses wound in a slack state at an outermost side of the winding member when approximately half of lengths of the plurality of wire harnesses are wound by the winding member.

In the present invention, the plurality of wire harnesses is preferably formed in a belt shape.

In the present invention, a portion of each of the plurality of wire harnesses which is inserted in the wire harness insertion portion is preferably folded back, and the folded portion of each of the plurality of wire harnesses is preferably movably provided in a circumferential direction of the circumferential surface.

In the present invention, the plurality of wire harnesses can be wired over a base and a slide structure which is slidably provided to the base, and the winding member can rotate in synchronization with a motion of a driving member which slidably drives the slide structure to lead or wind the plurality of wire harnesses.

The present invention includes: a fixing member to which one ends of a plurality of wire harnesses are fixed; and a winding member of a tubular shape which is formed coaxially with the fixing member, and whose circumferential surface is provided with the plurality of wire harnesses to be able to wind, and the circumferential surface of the winding member is provided with a plurality of wire harness insertion portions at an interval in a circumferential direction, the plurality of wire harnesses is individually inserted with an excess length in the plurality of wire harness insertion portions, and other ends are led out to an outside of the winding member. Further, according to the present invention, when the plurality of wire harnesses is at a first position of a winding position at which the plurality of wire harnesses is wound by the winding member and a leading position at which the plurality of wire harnesses is led from the winding member, a portion of the excess length is wound by the fixing member, and, when the plurality of wire harnesses is at a second position of the winding position and the leading position, the portion of the excess length is slacked between the fixing member and the winding member. According to this configuration, it is possible to reduce a friction between the wire harnesses which occurs at each portion of the excess length when a plurality of wire harnesses is wound and led.

Consequently, according to the present invention, it is possible to provide the wire harness winding device which hardly applies a burden to the wire harnesses when winding and leading the wire harnesses.

BRIEF DESCRIPTION OF DRAWINGS

FIG. 4 is a top view showing that the slide door of the wire harness winding device shown in FIG. 1 is fully closed;

FIGS. 5A and 5B are top views showing a wire harness winding device according to a second embodiment of the present invention;

FIGS. 6A to 6C are top views showing a wire harness winding device according to a third embodiment of the present invention;

FIGS. 7A to 7C are schematic views showing a state in time series where wire harnesses wound by a winding member are fed in the wire harness winding device according to the third embodiment of the present invention;

FIG. 10 is a top view showing that the slide door of the wire harness winding device shown in FIG. 8 is fully closed.

DETAILED DESCRIPTION

[First Embodiment]

Figure 1:
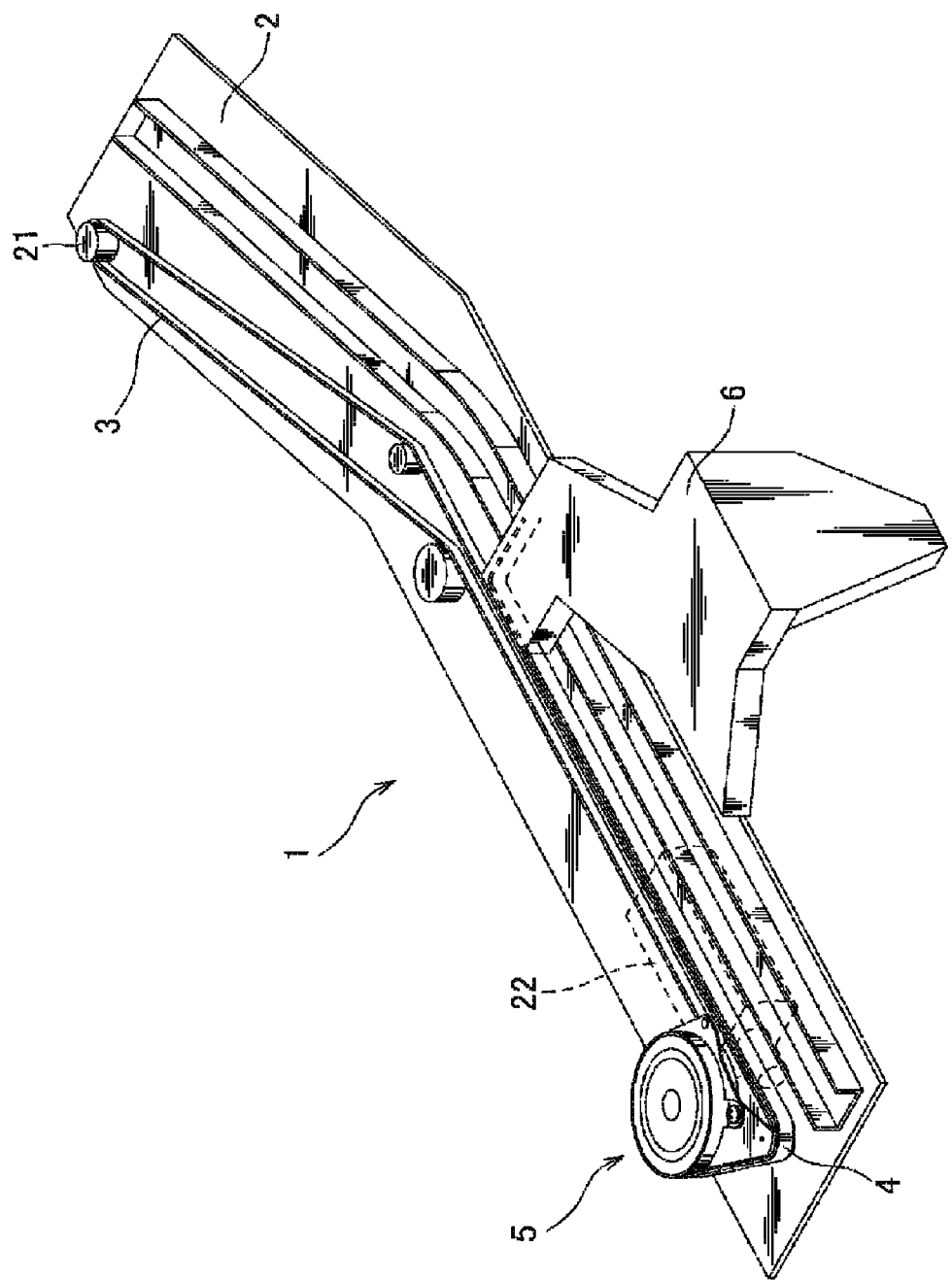
FIG. 1 is a perspective view showing a harness wiring structure including a wire harness winding device according to a first embodiment of the present invention.
Figure 2:
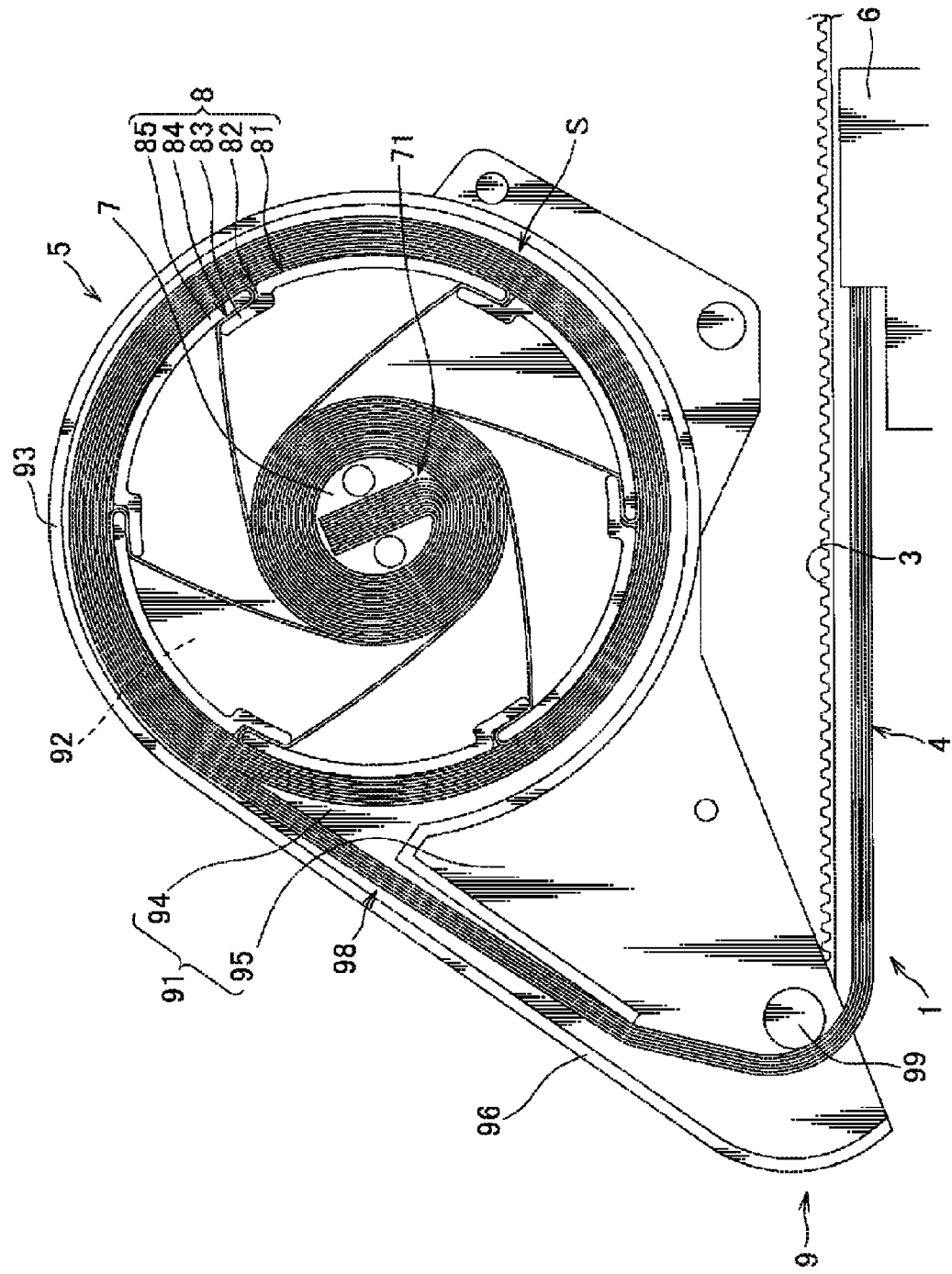
FIG. 2 is a top view showing that a slide door of the wire harness winding device shown in FIG. 1 is fully opened.

A wire harness winding device according to the first embodiment of the present invention will be described below with reference to FIGS. 1 and 2. FIG. 1 is a perspective view illustrating a harness wiring structure 1 including a wire harness winding device 5 according to the present embodiment. FIG. 2 is a top view illustrating that a slide door of the wire harness winding device 5 shown in FIG. 1 is fully opened.

As shown in FIG. 1, the harness wiring structure 1 includes a vehicle (base) 2 (which is only partially shown), a driving belt 3 which is driven to open and close a slide door (a slide structure which is not shown except a door arm 6) slidably provided to the vehicle 2, a plurality of wire harnesses 4 which is provided across the vehicle 2 and the slide door, and the wire harness winding device 5 which winds the wire harnesses 4.

In addition, a length direction of the vehicle 2 in FIG. 1 is a longitudinal direction, and a right side in FIG. 1 is a front. FIG. 1 shows a state where the slide door is positioned at a middle between a front side and a rear side of the vehicle 2 and is opened half, and FIG. 2 shows a state where the slide door slides toward the rear side of the vehicle 2 and is fully opened. In addition, in the vehicle 2 in FIGS. 1 and 2, a side at which the wire harnesses 4 are wired is referred to as a top surface, and an opposite side (a side at which a rotation driving device 22 described below is provided) is referred to as a lower surface. However, the wire harnesses are arranged upside down in an actual vehicle.

The harness wiring structure 1 is arranged on and fixed to the top surface of a flat member (the vehicle 2 according to the present embodiment) horizontally provided at a lower side of a step of the vehicle. The slide door is provided to the vehicle 2 to be slidable in the longitudinal direction of the vehicle 2 via the door arm 6. The slide door includes various electrical components such as a door lock unit, a speaker, a switch unit and a power window motor. The electrical components of the slide door receive supply of power from the vehicle 2 via the wire harnesses 4, and transmit and receive electrical signals.

As shown in FIG. 1, the driving belt 3 is endlessly stretched between a pulley 21 and a sprocket (not shown) of the rotation driving device (driving member) 22 which are provided on the top surface at the front side of the vehicle 2. Further, the driving belt 3 is stretched extending in the nearly longitudinal direction of the vehicle 2. The rotation driving device 22 is provided on the lower surface of the vehicle 2, and is positioned below the wire harness winding device 5 across the vehicle 2. The sprocket is provided between the top surface of the vehicle 2 and the wire harness winding device 5. When a control unit (not shown) drives the rotation driving device 22, the sprocket rotates, a rotation force of the sprocket is transmitted to the driving belt 3 and the driving belt 3 is driven to rotate.

When the control unit (not shown) receives an input of an instruction signal for actuating the slide door to open and close, the control unit drives the rotation driving device 22 to drive and rotate the driving belt 3. A rotation driving force of the driving belt 3 slides (slides and drives) the slide door via the door arm 6 to open and close. When the driving belt 3 rotates clockwise, the slide door side of the driving belt 3 moves backward. Further, when the driving belt 3 rotates counterclockwise, the slide door side of the driving belt 3 moves forward.

Each wire harness 4 has flexibility, and is arranged across the vehicle 2 and the slide door (door arm 6). Each wire harness 4 is electrically connected to a battery (not shown) of the vehicle 2, another electrical part or a control device, and supplies power from the vehicle 2 to the electrical components provided to the slide door and transmits and receives electrical signals. The wire harnesses 4 include a plurality of wires (not shown) and a plurality of connectors (not shown) provided to wire end portions (end portions of the wire harnesses 4). In the wire harnesses 4, the connectors provided to one ends of the wire harnesses 4 fit to the battery of the vehicle 2, and the connectors provided to the other ends fit to the connectors of the wire harnesses of the slide door and the connectors of the various electrical components.

The wire harness winding device 5 is a device which winds or leads a plurality of wire harnesses 4 wired in the harness wiring structure 1 in response to a slide door opening/closing operation, and 15 provided above the sprocket. The wire harness winding device 5 includes a fixing member 7 to which the one ends of a plurality of wire harnesses 4 are fixed, a winding member 8 of a tubular shape which is provided to be able to wind a plurality of wire harnesses 4, and a case 9 which includes the fixing member 7 and the winding member 8. The fixing member 7 is a member of a columnar bar shape which is extended from the case 9 toward an upper side in a nearly vertical direction, a slit 71 formed by cutting a circumferential surface of the fixing member 7 toward an inside of a diameter direction of a circle is formed, and the one ends of a plurality of wire harnesses 4 are inserted in and fixed to the slit 71 (FIG. 2). In addition, a plurality of wire harnesses 4 inserted in the slit 71 are further extended and are electrically connected to the battery (not shown) of the vehicle 2.

The winding member 8 is a bottomed cylindrical member formed coaxially with the fixing member 7, and, on a circumferential surface 85 of the winding member 8, a plurality of wire harnesses 4 is formed to be able to be winded. The winding member 8 is provided to the case 9 such that an inner circumferential surface of a surrounding wall 81 opposes to the circumferential surface of the fixing member 7 with a bottom surface arranged at a lower side (a vehicle 2 side). The winding member 8 rotates in synchronization with a motion of the driving belt 3, and winds and leads a plurality of wire harnesses 4. More specifically, the winding member 8 directly or indirectly receives a rotation force of the rotation driving device 22, and rotates in synchronization with the rotation driving device 22.

On the circumferential surface 85 (surrounding wall 81), a plurality of wire harness insertion portions 82 of a slit shape extending in parallel to an axial direction of the fixing member 7 is provided at fixed intervals in the circumferential direction. The number of wire harness insertion portions 82 corresponds to the number of wire harnesses 4, and the wire harnesses 4 are inserted in the wire harness insertion portions 82, respectively. At an inner circumferential side (fixing member 7 side) of a plurality of wire harness insertion portions 82, a guide plate 83 is provided vertically from a bottom surface (circular portion 94) such that the guide plate 83 is in parallel to and partially overlaps the surrounding wall 81 to cover a plurality of wire harness insertion portions 82. An end portion of the surrounding wall 81 arranged at a clockwise side of a plurality of wire harness insertion portions 82, and an end portion at a clockwise side of the guide plate 83 are integrally formed continuing to each other. At a portion at which the surrounding wall 81 and the guide plate 83 overlap, a guide path 84 is formed.

A plurality of wire harnesses 4 is individually inserted in a plurality of wire harness insertion portions 82 with excess lengths, and passes through the guide path 84 such that the other ends of a plurality of wire harnesses 4 are led out to an outside of the winding member 8.

The case 9 includes a flat member 91, an outer shape of the case 9 is formed to go along a shape of a flat member (vehicle 2) horizontally provided at the lower side of the step of the vehicle and is formed to be housed in this flat member.

The flat member 91 includes the circular portion 94 which is formed in a nearly circular shape and a protruded portion 95 of a nearly triangular shape tapered protruding from the circular portion 94, and is arranged in nearly parallel to the flat member (vehicle 2) horizontally provided at the lower side of the step of the vehicle. Part of an end portion of the circular portion 94, and an end portion of one side of sides from the circular portion 94 to a distal end of the protruded portion 95 are provided with a sidewall 96 which is vertically provided upward from the flat member 91. The case 9 is provided such that the circular portion 94 is arranged nearly above the rotation driving device 22 and the sprocket and, in FIGS. 1 and 2, the sidewall 96 closer to the rear side of the vehicle 2 is placed closer to the slide door. Near the distal end portion of the protruded portion 95, a projection portion 99 of a nearly columnar shape vertically provided at an upper side of the protruded portion 95 is provided.

On a top surface of the circular portion 94 of the flat member, an accommodating portion 92 which rotatably accommodates the winding member 8 is formed. The accommodating portion 92 is a bottomed space of a nearly bottomed cylindrical shape whose bottom portion is the circular portion 94 and is formed by an accommodating wall 93 vertically provided in an arc shape and the sidewall 96. The circumferential surface 85 of the accommodated winding member 8, and the accommodating wall 93 and the sidewall 96 are arranged to oppose to each other, and, in a gap S formed between the circumferential surface 85, and the accommodating wall 93 and the sidewall 96, a plurality of wire harnesses 4 wound by the circumferential surface 85 of the winding member 8 is arranged. In addition, an end portion at a counterclockwise side of the accommodating wall 93 and the sidewall 96 are integrally formed continuing to each other, and a gap is formed between an end portion at a clockwise side of the accommodating wall 93 and the sidewall 96 to form a lead-out portion 98. A plurality of wire harnesses 4 wound by the winding member 8 travel toward the distal end of the protruded portion 95 via the lead-out portion 98, is placed in a state parallel to the driving belt 3 by the projection portion 99 and is led out to an outside of the wire harness winding device 5.

Next, how to wire a plurality of wire harnesses 4 in the harness wiring structure 1 and the wire harness winding device 5 will be described. In addition, belt-shaped wire harnesses can be suitably used for the wire harnesses 4, and the belt-shaped wire harnesses will be described as an example in this description. In addition, the belt-shaped wire harnesses 4 are flexible flat cables, for instance.

A plurality of wire harnesses 4 is overlaid and bundled, and one ends of a plurality of wire harnesses 4 are fixed to the slit 71 of the fixing member 7. A plurality of wire harnesses 4 is led from the slit 71 in a direction orthogonal to the axial direction of the fixing member 7, then has excess lengths when wound by the circumferential surface of the fixing member 7 clockwise (winding direction) a plurality of times in a state where a plurality of wire harnesses 4 is overlaid, passes the guide path 84, is individually inserted in the wire harness insertion portions 82 provided to the surrounding wall 81 of the winding member 8 and is led to the outside of the winding member 8 (gap S) (FIG. 2). In this regard, the "excess length" refers to a length of a margin, and a portion of each of a plurality of wire harnesses 4 from a portion led from the slit 71 to a portion inserted in each of the wire harness insertion portions 82 is referred to as an excess length portion.

Each wire harness 4 led to the gap S is folded back counterclockwise, is wound by the surrounding wall 81 of the winding member 8 counterclockwise a plurality of times, is led to the distal end of the protruded portion 95 via the lead-out portion 98, is folded back by the projection portion 99 and is led out to the outside of the wire harness winding device 5. A plurality of wire harnesses 4 led out to the outside of the wire harness winding device 5 is arranged extending in nearly parallel to the driving belt. 3. A plurality of wire harnesses 4 is fixed to the slide door (door arm 6) and is electrically connected to the electrical components of the slide door, and supplies power or transmits and receives signals.

Next, an example of an operation of the above-described wire harness winding device 5 will be described below with reference to FIGS. 2 to 4. First, in a state where the slide door is fully opened, a plurality of wire harnesses 4 is at a winding position at which a plurality of wire harnesses 4 is wound by the winding member 8 counterclockwise. In this case, the excess length portions of a plurality of wire harnesses 4 are wound by the fixing member 7 clockwise (winding direction) (FIG. 2).

When the control unit receives from an opening/closing switch an input of an instruction signal for closing the slide door in a state where the slide door is fully opened, the control unit drives the rotation driving device 22, and drives the driving belt 3 to rotate in a counterclockwise direction, and then the slide door (door arm 6) starts moving forward. A plurality of wire harnesses 4 is fixed to the side door, and therefore is pulled toward the front side in response to forward movement of the slide door. In this case, the winding member 8 receives the rotation force of the rotation driving device 22, rotates counterclockwise (a direction opposite to the winding direction) in synchronization with the motion of the driving belt 3, and leads a plurality of wire harnesses 4 wound by the surrounding wall 81, to the outside of the wire harness winding device 5 via the lead-out portion 98.

Figure 3:
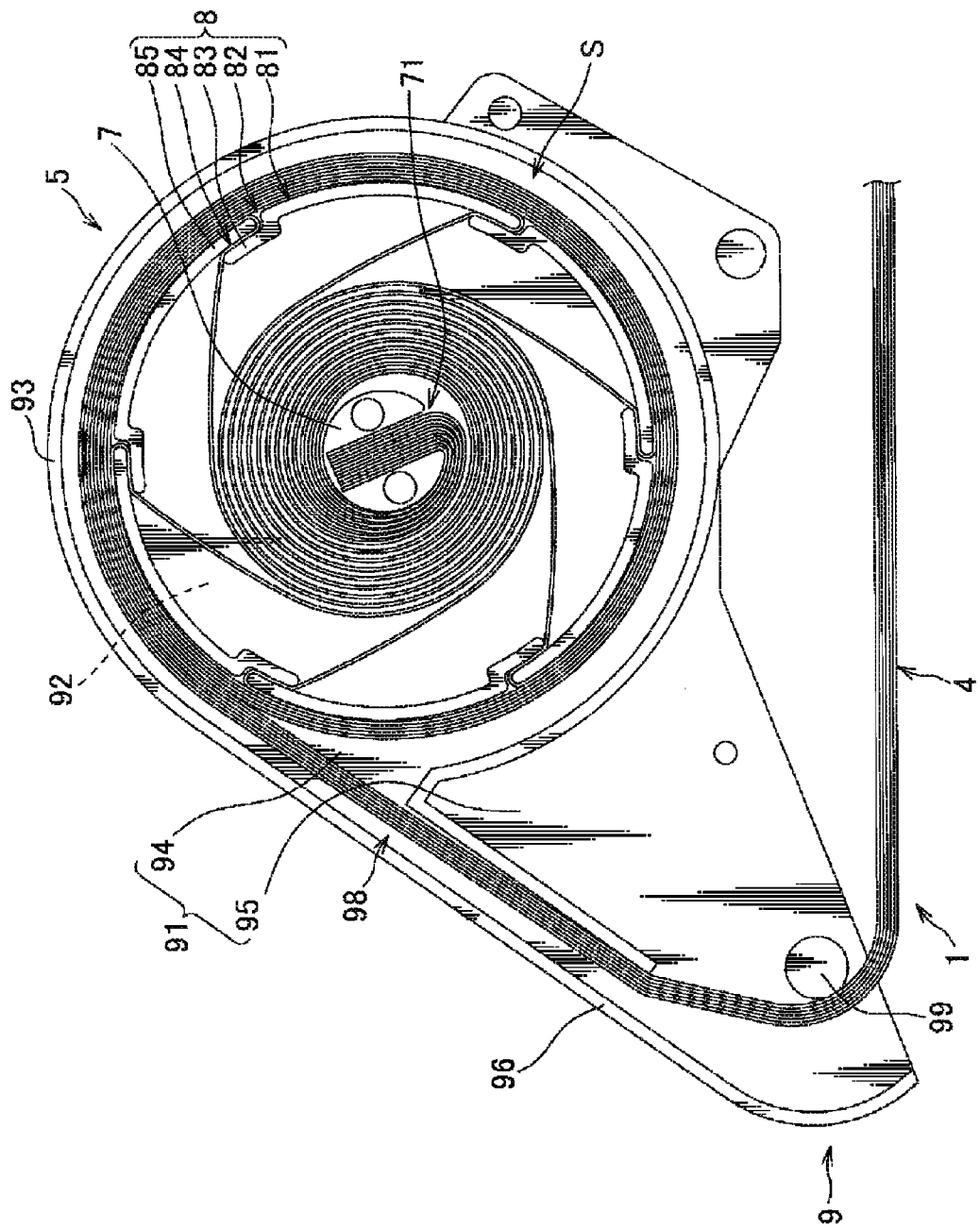
FIG. 3 is a top view showing that the slide door of the wire harness winding device shown in FIG. 1 is opened half.

FIG. 3 is a top view of the wire harness winding device 5 in a state where the slide door is opened half, and FIG. 4 is a top view of the wire harness winding device 5 in a state where the slide door is fully opened. In addition, FIGS. 3 and 4 do not illustrate the driving belt 3 and the door arm 6. Counterclockwise rotation of the winding member 8 weakens winding of the excess length portions wound around the fixing member 7 clockwise, and makes the excess length portions slack between the fixing member 7 and the winding member 8.

In a state where the slide door is fully closed, a plurality of wire harnesses 4 is at a leading position at which a plurality of wire harnesses 4 is led from, the winding member 8. In this case, winding of the excess length portions around the fixing member 7 weakens the most, and therefore the excess length portions slack the most between the fixing member 7 and the winding member 8. That is, as a plurality of wire harnesses 4 moves from the winding position to the leading position, the winding of the excess length portions weakens, and, by contrast with this, the degree of slacking strengthens.

In the wire harness winding device 5 according to the present embodiment, a plurality of wire harnesses 4 is inserted in the wire harness insertion portions 82 with the excess lengths, is led to the outside of the winding member 8 and is wound by the surrounding wall 81 of the winding member 8. According to this configuration, it is possible to reduce, at the excess length portions, a friction between the wire harnesses 4 which occurs when each wire harnesses 4 is wound and led. Consequently, it is possible to suppress deterioration caused by the friction between a plurality of wire harnesses 4 so that a burden is hardly applied to a plurality of wire harnesses 4.

Further, in the wire harness winding device 5 according to the present embodiment, the winding member 8 formed coaxially with the fixing member 7 rotates to wind a plurality of wire harnesses 4, and the fixing member 7 to which a plurality of wire harnesses 4 is fixed does not move. According to this configuration, it is possible to directly connect a plurality of wire harnesses 4 without a sliding contact with other wire harnesses connected to the battery. Consequently, it is possible to simplify the configuration of the harness wiring structure 1 including the wire harness winding device 5.

Further, in the wire harness winding device 5 according to the present embodiment, the winding member 8 includes the guide path 84 formed by the guide plate 83. According to this configuration, it is possible to suppress a change in folding angles of a plurality of wire harnesses 4 caused by winding and slacking with respect to the fixing member 7 due to rotation of the winding member 8. Consequently, it is possible to reduce a burden applied to a plurality of wire harnesses 4 and caused by a repetitive change in the folding angles.

Further, in the wire harness winding device 5 according to the present embodiment, a plurality of wire harnesses 4 is inserted in the wire harness insertion portions 82 such that the intervals between a plurality of wire harnesses 4 in the circumferential direction are equal. According to this configuration, a plurality of wire harnesses 4 is uniformly wound by the fixing member 7, so that it is possible to neatly wind the excess length portions around the fixing member 7. Consequently, it is possible to smoothly rotate the winding member 8 and, as a result, make winding performance and leading performance of the wire harness winding device 5 for a plurality of wire harnesses 4 excellent.

Further, in the wire harness winding device 5 according to the present embodiment, the winding member 8 can rotate in synchronization with a motion of the rotation driving device 22 which drives the slide door (door arm 6), and place a plurality of wire harnesses 4 at the winding position or the leading position. Consequently, it is possible to wind and lead a plurality of wire harnesses 4 at an adequate timing in response to opening or closing of the slide door. Further, it is not necessary to provide another member which rotates the winding member 8, and it is possible to reduce the number of parts which are necessary to wind a plurality of wire harnesses 4, so that it is possible to reduce cost and weight.

[Second Embodiment]

Next, a wire harness winding device according to the second embodiment of the present invention will be described with reference to FIG. 5. FIG. 5A is a top view of a wire harness winding device 5A according to the present embodiment, and FIG. 5B is an enlarged view of a winding member 8A at a rectangular broken line portion in FIG. 5A. The wire harness winding device 5A according to the present embodiment differs from that of the first embodiment in shapes of a plurality of wire harness insertion portions 82A of the winding member 8A. Further, the same components in FIG. 5 as those of the first embodiment will be assigned the same reference numerals, and the same configurations, operations and effects as those of the first embodiment will not be described.

In the present embodiment, a plurality of wire harness insertion portions 82A formed on a circumferential surface 85 (surrounding wall 81) of the winding member 8A is different from those of the first embodiment, and extends in a circumferential direction. Widths (extension lengths) of a plurality of wire harness insertion portions 82A in the circumferential direction only need to secure movement of folded portions 41 described below in the circumferential direction and can be set as follows, for instance.

When, for example, the diameter of the circumferential surface 85 of the winding member 8 is 125 mm, the length of the circumferential surface 85 is 125 (mm)×n 392.5 (mm). When the wire harness insertion portions 82A are provided on the circumferential surface 85 at fixed intervals, approximately 65 mm obtained by dividing the length of the circumferential surface 85 by the number of the wire harnesses 4 (the number of the wire harness insertion portions 82 which is six in the present embodiment) is the width of the circumferential surface 85 in the circumferential width allocated to one wire harness 4. In this regard, when, for example, a portion (length) secured to form a guide path 84 which overlaps a guide plate 83 is 12 mm, the width of each wire harness insertion portion 82A in the circumferential direction is 65 (mm)−12 (mm)=53 (mm). In this case, the folded portions 41 described below can move 53 mm at maximum in the circumferential direction (a broken line portion in FIG. 51B)

A plurality of wire harnesses 4 has belt shapes, has excess lengths when wound by a circumferential surface of a fixing member 7 clockwise (winding direction) a plurality of times in a state where a plurality of wire harnesses 4 is overlaid, passes through the guide path 84, is individually inserted in the wire harness insertion portions 82A and is led out to a gap S. A plurality of wire harnesses 4 led out to the gap S is folded back counterclockwise, is wound by the surrounding wall 81 of the winding member 8 counterclockwise a plurality of times, and is led out to an outside of the wire harness winding device 5 via a lead-out portion 98. In response to rotation of the winding member 8A, the folded portions 41 (portions inserted in the wire harness insertion portions 82A) of a plurality of wire harnesses 4 are movable in the circumferential direction in a state where a plurality of wire harnesses 4 is folded back (FIG. 5B).

Next, an example of an operation of the wire harness winding device 5A according to the present embodiment will be described below with reference to FIG. 5.

In a state where the slide door is fully opened, a plurality of belt-shaped wire harnesses 4 led out to the gap S is folded back counterclockwise, wound by the circumferential surface 85 of the winding member 8A, and then is led out to the outside of the wire harness winding device 5A via the lead-out portion. 98.

When a control unit receives from the opening/closing switch an input of an instruction signal for opening the slide door in a state where the slide door is fully closed, the winding member 8A receives a rotation force of the rotation driving device 22, rotates clockwise in synchronization with the motion of the driving belt 3, and starts winding a plurality of wire harnesses 4 around the circumferential surface 85.

In this case, in the present embodiment, a plurality of (six) belt-shaped wire harnesses 4 is overlaid. When, for example, the thickness of one wire harness 4 is 0.5 mm, the wire harnesses 4 have the thickness of 3 mm in a state where the six wire harnesses 4 are overlaid. When the diameter of the surrounding wall 81 of the winding member 8A is 125 mm, the first wire harness 4 and the sixth wire harness 4 differs in a size of 5 mm corresponding to the five wire harnesses 4 in a diameter direction of the surrounding wall 81. Hence, approximately 16 mm of the length differs between the first wire harness 4 and the sixth wire harness 4 per round. Hence, when the number of turns with respect to the winding member 8A is three as in the present embodiment, approximately 47 mm of the length differs between the first wire harness 4 in the first round and the sixth wire harness 4 in the third round, and, in a state where one side of the wire harnesses 4 is fixed to a door arm 6 and in a state where all wire harnesses 4 are housed and a state where all wire harnesses 4 are led, a slack corresponding to approximately 47 mm needs to be absorbed.

In the present embodiment, the wire harness insertion portions 82A extend in the circumferential direction of the circumferential surface 85, and, therefore, according to the slack which occurs in the wire harnesses 4, the folded portions 41 of the wire harnesses 4 move the wire harness insertion portions 82A in the clockwise direction to absorb the slack. When the width of each wire harness insertion portion 82A is 53 mm, each folded portion 41 can move 53 mm at maximum, and absorb the slack corresponding to 53 mm at maximum.

According to this configuration, the wire harness winding device 5A according to the present embodiment can absorb the slack of the wire harnesses which occurs when winding plurality of wire harnesses 4. Consequently, when a plurality of wire harnesses 4 is wound and led, it is possible to reduce a contact between the slack wire harness 4 and the other wire harnesses 4 and a friction which is caused when the slack wire harness 4 slides against another portion. Consequently, it is possible to suppress deterioration of a plurality of wire harnesses 4, and a burden is hardly applied to a plurality of wire harnesses 4.

[Third Embodiment]

Next, a wire harness winding device according to the third embodiment of the present invention will be described with reference to FIGS. 6A to 6C and 7. In a wire harness winding device 5B according to the present embodiment, a gap S formed between a housing portion formed by an accommodating wall 93 and a sidewall 96 according to the first embodiment, and a winding member 8 is larger than that of the first embodiment.

FIG. 6 simplifies a housing portion 10 formed by the accommodating wall 93 and the sidewall 96 according to the first embodiment, the winding member 8 and a plurality of wire harnesses 4, and shows only a semicircle.

FIG. 6A shows a state where all wire harnesses 4 are wound by the winding member 8 in a door open state, and FIGS. 6B and 6C illustrate states where two rounds of the wire harnesses 4 are wound by the winding member 8. FIG. 6B shows a state where the wire harnesses 4 are wound without taking into account a slack caused by a difference between inner and outer winding amounts, and FIG. 6O shows a state where a slack is caused by a difference between the inner and outer winding amounts. In addition, according to the present embodiment, when three rounds of the wire harnesses 4 are wound by the winding member 8, all wire harnesses 4 which need to be wound are wound by the winding member 8.

In addition, FIG. 6 simplifies a plurality of (six in the first embodiment) wire harnesses 4 for ease of understanding, and shows the two wire harnesses. Further, in FIG. 6, the same components as those in the first embodiment will be assigned the same reference numerals, and the same components, operations and effect as those in the first embodiment will not be described.

In the housing portion 10, a space corresponding to an accommodating portion 92 according to the first embodiment is formed, and the winding member 8 is rotatably accommodated in the space. A circumferential surface 85 of the accommodated winding member 8 and an inner circumferential surface of the housing portion 10 (accommodating wall 93B) are arranged to oppose to each other, a wire harness housing portion 11 corresponding to the gap S according to the first embodiment is provided between the circumferential surface 85 and the inner circumferential surface, and a plurality of wire harnesses 4 is housed in the wire harness housing portion 11. In the housing portion 10, an opening portion (not shown) is provided, and the opening portion forms a lead-out portion 98B.

The state shown in FIG. 6A is a state where all wire harnesses 4 having the same lengths as a movement amount obtained when a slide door transitions from a fully closed state to a fully open state are wound by the winding member 8. In this case, when the thickness of the wire harnesses 4 is taken into account, the lengths of the wound wire harnesses 4 are different between a first round, a second round and a third round.

FIG. 7 schematically shows in time series a state where the wire harnesses 4 are fed from a state where the wire harnesses 4 are wound by the winding member 8. FIG. 7A schematically shows a state where one round of the wire harnesses 4 wound by the winding member 8 is fed. FIG. 7B shows a state where two rounds are fed and FIG. 7C shows a state where three rounds, i.e., all wire harnesses 4 are fed. In each figure, to enable comparison between lengths of the wire harnesses 4 to be fed, i.e., led when a tension is applied, and a slide amount of the slide door, respective amounts are indicated by arrow lengths.

In addition, in the present embodiment, a winding state of the wire harnesses 4 will be tested under preconditions that a diameter of the winding member 8 is 125 mm, the thickness of the wire harnesses is 0.5 mm and all wire harnesses 4 are wound when the three rounds of the wire harnesses 4 are wound by the winding member 8.

As shown in FIG. 7A, a length required to wind one round of the wire harnesses 4 around the circumferential surface 85 (surrounding wall 81) is longer in case of the wire harnesses 4 arranged at an inner side than in case of the wire harnesses 4 arranged at an outer side. The length (feeding amount) of the wire harnesses 4 which can be fed to an outside of the wire harness winding device 5B when the winding member 8 rotates once counterclockwise is shorter than in case of the wire harnesses 4 arranged at the outside, and becomes shorter toward the inner side. A rotation amount of the winding member 8 (the length of the circumferential surface 85) and a motion of the slide door (driving belt 3) are synchronized and, when the feeding amount exceeds the rotation amount of the winding member 8, this difference in line lengths is a slack.

As shown in FIG. 7A, when one around of the wire harnesses 4 is fed from the winding member 8, the long and outermost wire harness 4 is fed, and the slide door slides at ⅓ of a total slide amount. The former is 434 mm, the latter is 415 mm, and a difference between the former and the latter is 19 mm.

Next, when the second round of the wire harnesses 4 is fed from the winding member 8, 415 mm of the wire harnesses 4 which is the same as the slide amount of the slide door is fed as shown in FIG. 7B. At this stage, a difference between a total feeding amount of the wire harnesses 4 and the slide amount of the slide door is 19 mm since a difference at the first stage is kept as is.

Further, when the third round of the wire harnesses 4 is fed from the winding member 8, 396 mm of the wire harnesses 4 which is shorter than the slide amount of the slide door is fed as shown in FIG. 7C. A total fed length in case where all three rounds of the wire harnesses 4 are fed from the winding member 8, is 434 mm+415 mm+396 mm=1245 mm, and matches with a total slide amount of the slide door of 415 mm×3=1245 mm.

A difference between a feeding amount of the wire harnesses 4 and the slide amount of the slide door is actually a slack of winding with respect to the winding member 8. An outer diameter of this slack maximizes in a state where the second round of the wire harnesses 4 is fed. That is, this state is a state where, in addition to the thickness in case where one round of the wire harness 4 is wound by the winding member 8, the second round of the wire harnesses 4 whose outer diameter which slacks (relaxes) by a line length difference of 19 mm overlaps (see FIG. 6C.). A wire harness housing portion 11 is provided to secure a sufficient space with intervals from the wire harnesses 4 whose outer diameters maximize.

A diameter of the wire harness housing portion 11 which is necessary to absorb a line length difference and which needs to be enlarged is calculated according to following [equation 1], and it is found that more 6 mm is necessary. A gap between the inner circumferential surface of the housing portion 10 and the circumferential surface 85 of the winding member 8 corresponds to a radius, and therefore 3 mm which is half the radius is necessary.

{Diameter of wire harness housing portion which is necessary to absorb line length difference and which needs to be enlarged (mm)}={line length difference (mm)}/n=19 (mm)/π≈6   [Equation 1]

In the states in FIGS. 7B and 6C where the second round of the wire harnesses 4 is fed, the first round of the wire harnesses 4 is fed, and therefore 1 mm which is the thickness of the two wire harnesses 4 contributes to absorbing a slack caused by a line length difference. Hence, 2 mm obtained by subtracting 1 mm from 3 mm which is necessary as the gap between the inner circumferential surface of the housing portion 10 and the circumferential surface 85 of the winding member 8 is an inner diameter of the housing portion 10 which needs to be enlarged to absorb a slack caused by the line length difference. In other words, by enlarging an inner diameter of the housing portion 10 by 2 mm, it is possible to absorb the line length difference of 19 mm.

The thickness of the wound wire harnesses 4 in a state where all wire harnesses 4 are wound is calculated as 3 mm according to following [equation 2].

{Thickness of wire harness 4 (mm)}×{the number of wire harnesses 4}×{the number of turns of wire harnesses 4 wound by winding member 8}=0.5 (mm)×2 (the number of wire harnesses 4)×3 (the number of turns)=3 mm   [Equation 2]

Originally, even in a state where all wire harnesses 4 are wound (see FIG. 6A), some margin is secured to prevent a contact between the wire harnesses 4 and the housing portion 10. When the margin is 2 mm, if absorption of the line length difference is not taken into account, a gap between the inner circumferential surface of the housing portion 10 and the circumferential surface 85 of the winding member 8 is calculated as 5 mm according to following [equation 3].

{Thickness of wire harnesses 4 wound in state where all wire harnesses 4 are wound}+{margin}=3 mm+2 mm=5 mm   [Equation 3]

As described above, it is necessary to enlarge the line length 2 mm to absorb the line length difference of 19 mm, and therefore a gap between the inner circumferential surface of the housing portion 10 and the circumferential surface 85 of the winding member 8 is calculated as 7 mm according to following [equation 4].

{Gap between inner circumferential surface of housing portion 10 and circumferential surface 85 of winding member 8 in case where absorption of line length difference is not taken into account}=5 mm+2 mm=7 mm   [Equation 4]

Next, an example of an operation of the wire harness winding device 5B according to the present embodiment will be described below with reference to FIGS. 6 and 7. In addition, one of a plurality of wire harnesses 4 will be focused upon and described for ease of understanding.

When a control unit receives from an opening/closing switch an input of an instruction signal for opening the slide door in a state where the slide door is fully closed (FIG. 7C), the winding member 8 receives a rotation force of a rotation driving device 22, rotates clockwise in synchronization with a motion of a driving belt 3 and leads (feeds) the wire harnesses 4 to an outside of the wire harness winding device 5B.

When an approximately half of the lengths of the wire harnesses 4 are fed in a state where the slide door is opened half, (the second round of) the wire harnesses 4 slack in the wire harness housing portion 11. In this regard, the slack portion of the wire harnesses 4 having an interval from the housing portion 10 spreads in the wire harness housing portion 11 (FIG. 6C).

When the slide door is fully opened, a line length difference between a rotation amount of the winding member 8 and the slide door is canceled, and a slack state of the wire harness 4 is released (FIG. 7C).

According to this configuration, in the wire harness winding device 5B according to the present embodiment, the wire harness housing portion 11 can absorb a line length difference between the rotation amount of the winding member 8, a feeding amount and the slide amount of the slide door which is produced when a plurality of wire harnesses 4 is led. Hence, when a plurality of wire harnesses 4 is wound and led, the slack wire harnesses 4 do not contact the housing portion 10 and therefore hardly deteriorate, and a burden is hardly applied to the wire harnesses 4.

In addition, the above-described three embodiments are only exemplary embodiments of the present invention, and the present invention is not limited to these embodiments. That is, one of ordinary skill in the art can variously modify and carry out the embodiments according to conventionally known knowledge without departing from the spirit of the present invention. These modifications are naturally included in the scope of the present invention as long as the modifications include the configuration of the wire harness winding device according to the present invention.

For example, in the above embodiments, a configuration has been described where, when a plurality of wire harnesses 4 moves from a winding position to a leading position, the winding member 8 rotates in a direction opposite to a direction in which excess length portions are wound by a fixing member 7, and the excess length portions transition from state where the excess length portions are wound by the fixing member 7 to a state where the excess length portions slack between the fixing member 7 and the winding member 8. However, the present invention is not limited to this.

For example, the above embodiments may employ a configuration where, when a plurality of wire harnesses 4 moves from the winding position to the leading position, the winding member 8 rotates in the same direction as a direction in which the excess length portions are wound by the fixing member 7, and the excess length portions transition from a state where the excess length portions slack between the fixing member 7 and the winding member 8 to a state where the excess length portions are wound by the fixing member 7. A modified example will be specifically described below with reference to FIGS. 8 to 10.

Figure 8:
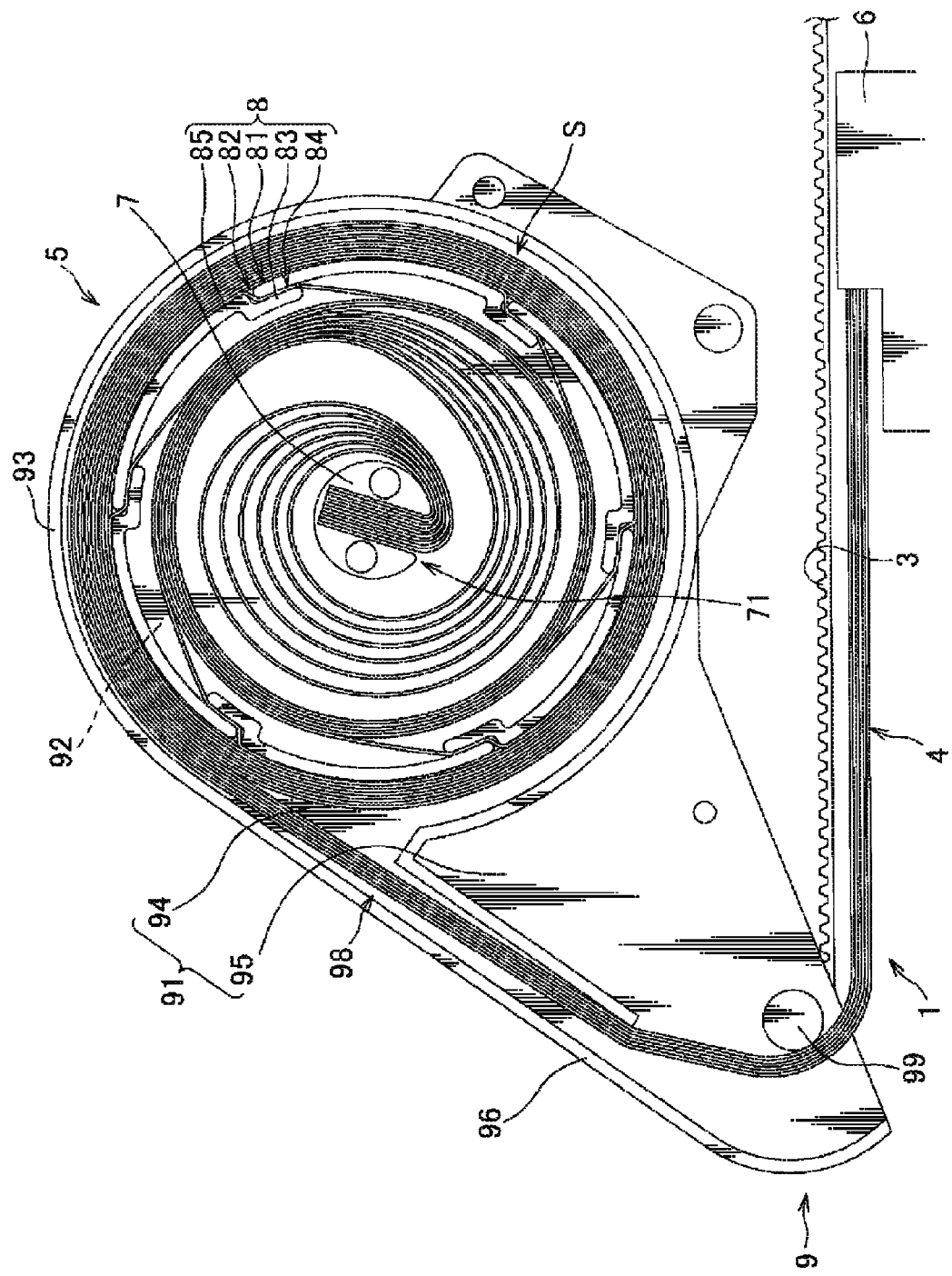
FIG. 8 is a top view showing that a slide door of a wire harness winding device according to another embodiment is fully opened.

FIG. 8 shows a state where a slide door slides toward a rear side of a vehicle 2 and is fully opened in the modified example. A plurality of wire harnesses 4 is led from a slit 71 to a direction orthogonal to an axial direction, has excess lengths when counterclockwise winding slacks between a fixing member 7 and a winding member 8, is individually inserted in wire harness insertion portions 82 provided to a surrounding wall 81 (circumferential surface 85) of the winding member 8, and is led out to an outside (gap S) of the winding member 8 (FIG. 8). Each wire harness 4 led out to the gap S is wound by the circumferential surface 85 of the winding member 8 counterclockwise a plurality of times without being folded back, and is led out to an outside of a wire harness winding device 5 via a lead-out portion 98. Further, an end portion of the surrounding wall 81 arranged at a counterclockwise side of a plurality of wire harness insertion portions 82 and an end portion at a counterclockwise side of a guide plate 83 are integrally formed continuing to each other. At a portion at which the surrounding wall 81 and the guide plate 83 overlap, a guide path 84 is formed.

Next, an example of an operation of an above-described wire harness winding device 5 will be described below with reference to FIGS. 8 to 10. First, in a state where a slide door is fully opened, a plurality of wire harnesses 4 is at a winding position at which a plurality of wire harnesses 4 is wound by the winding member 8 counterclockwise. In this case, excess length portions of a plurality of wire harnesses 4 slack between the fixing member 7 and the winding member 8 (FIG. 8).

When a control unit receives from an opening/closing switch an input of an instruction signal for closing the slide door in a state where the slide door is fully opened, the control unit drives a rotation driving device 22, and drives a driving belt 3 to rotate in a counterclockwise direction, and then the slide door (door arm 6) starts moving forward. A plurality of wire harnesses 4 is fixed to the slide door, and therefore is pulled toward a front side as the slide door moves forward. In this case, the winding member 8 receives a rotation force of the rotation driving device 22, rotates counterclockwise (the same direction as a winding direction) in synchronization with a motion of the driving belt 3, and leads a plurality of wire harnesses 4 wound by the surrounding wail 81, to an outside of the wire harness winding device 5 via the lead-out portion 98.

Figure 9:
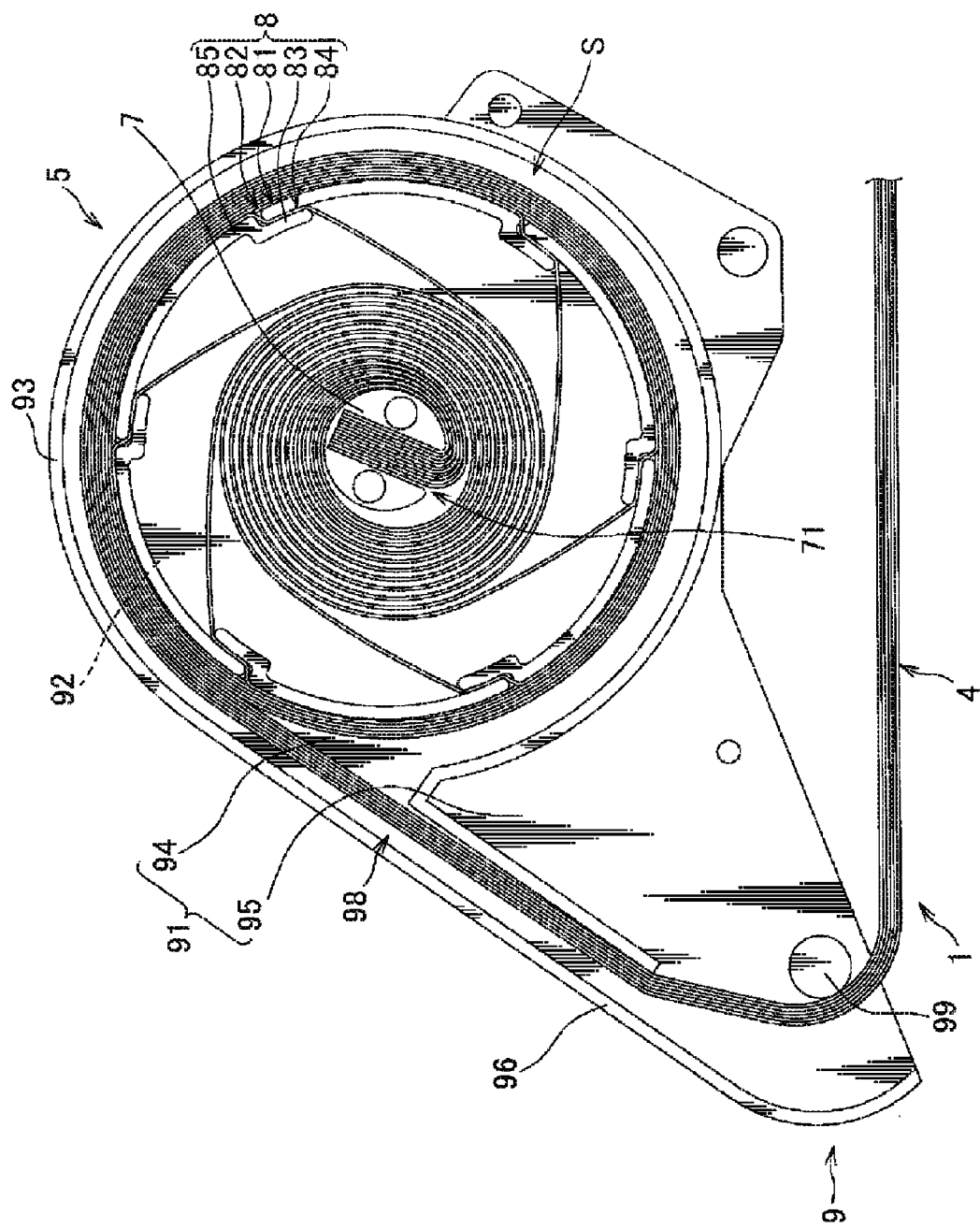
FIG. 9 is a top view showing that the slide door of the wire harness winding device shown in FIG. 8 is opened half.
Figure 11A:
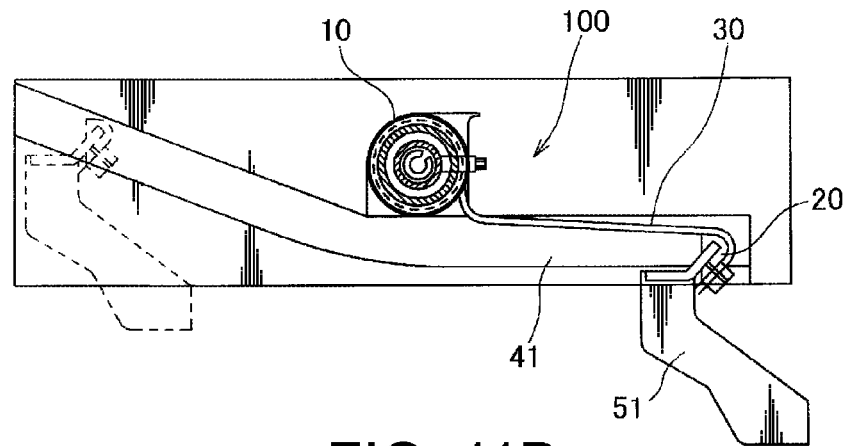
FIGS. 11A and 11B show a conventional wire harness winding device.
Figure 11B:
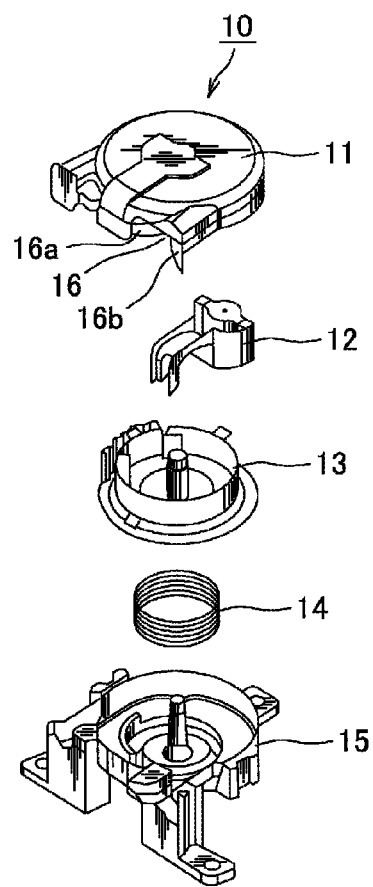

FIG. 9 is an enlarged view of excess length portions in case where the slide door is opened half, and FIG. 10 is an enlarged view of the excess length portions in case where the slide door is fully closed. In addition, FIGS. 9 and 10 do not illustrate the driving belt 3 and the door arm 6. Counterclockwise rotation of the winding member 8 starts winding the excess length portions around the fixing member 7 counterclockwise, this winding gradually strengthens, and the excess length portions are wound by the fixing member 7 counterclockwise (winding direction).

In a state where the slide door is fully closed, a plurality of wire harnesses 4 is at a leading position at which a plurality of wire harnesses 4 is led from the winding member 8. In this case, the excess length portions are wound by the fixing member 7 the most strongly. That is, as a plurality of wire harnesses 4 moves from a winding position to a leading position, a slack of the excess length portions weakens, and, by contrast with this, the winding strengthens.

According to the above modified example, the example has been described where, in the first embodiment, the wire harnesses 4 are wound by the winding member 8 in a counterclockwise direction opposite to that of the first embodiment. However, the modified example where a winding direction in which the wire harnesses 4 are wound by the winding member 8 is inverted is applicable to the second embodiment and the third embodiment, too. In this regard, the modified example is applicable to the third embodiment as is. However, to apply the modified example to the second embodiment, it is necessary to take a measure of, for example, providing a folding guide plate of a flat shape which is vertically provided from a circular portion 94 to fold back again the wire harnesses 4 folded back in a plurality of wire harness insertion portions 82A to lead in a clockwise direction.

In the first to third embodiments, the examples where wire harnesses of belt shapes can be suitably used for the wire harnesses 4 have been described. However, it is also possible to use wire harnesses of shapes other than belt shapes.

Further, in the above embodiments, a plurality of wire harnesses 4 is inserted in the wire harness insertion portions 82 such that intervals between the wire harnesses 4 are equal in a circumferential direction. The present invention is not limited to these embodiments. One wire harness 4 only needs to be inserted in one wire harness insertion portion 82, and intervals between the wire harnesses 4 in the circumferential direction may not be equal, i.e., for example, the wire harnesses 4 may be inserted unevenly in part of a plurality of wire harness insertion portions 82 among a plurality of wire harness insertion portions 82 of the circumferential surface 85 (surrounding wall 81), Further, the above embodiments employ the configuration where a plurality of wire harness insertion portions 82 is formed in slit shapes elongated in parallel to an axial direction of the fixing member 7. However, as long as the wire harnesses 4 are inserted and fixed and other ends of the wire harnesses 4 can be led out to an outside of the winding member 8, the present invention is not limited to this, and a plurality of wire harness insertion portions 82 may be formed by providing circular holes in the circumferential surface 85 (surrounding wall 81). Further, the above embodiments employ the configuration where the numbers of the wire harness insertion portions 82 and 82A are the same as the number of wire harnesses 4. As long as the numbers of the wire harness insertion portions 82 and 82A are greater than the number of a plurality of wire harnesses 4, the present invention is not limited to this. In this case, it is possible to wind an arbitrary number of wire harnesses 4 whose upper limit is the numbers of the wire harness insertion portions 82 and 82A, so that it is possible to realize part standardization.

Further, the above embodiments employ the configuration where the guide plate 83 and the guide path 84 are provided. However, the present invention is not limited to this. For example, a configuration where the guide plate 83 and the guide path 84 are not provided may be employed, and the guide plate 83 may not be formed continuing to the surrounding wall 81 and may not be provided vertically from a bottom surface (circular portion 94).

In the above embodiments, the winding member 8 (winding member 8A) is a bottomed cylindrical member. However, as long as the winding member 8 (winding member 8A) has a cylindrical shape and can wind a plurality of wire harnesses 4 around the surrounding wall 81, the present invention is not limited to this, and the winding member 8 (winding member 8A) may have a polygonal cylindrical shape such as a square cylindrical shape or a hexagonal cylindrical shape.

The above embodiments employ the configuration where wire harness winding devices 5, 5A and 5B are provided as components of a harness wiring structure 1 to the vehicle 2. However, the present invention is not limited to this, and the wire harness winding devices 5, 5A and 5B may not be provided on a car and may be provided to a slide door other than a car. For example, the wire harness winding device 5 (the wire harness winding device 5A and the wire harness winding device 5B) may be wired across the vehicle 2 and a slide sheet, for example, in the vehicle 2.

Further, in the above embodiments, the winding member 8 (winding member 8A) is configured to directly or indirectly receive a rotation force of the rotation driving device 22, and rotate in synchronization. The present invention is not limited to this, and the winding member 8 (winding member 8A) may be configured to be rotated by using another driving device which rotates the winding member 8 (winding member 8A). In this case, it is not indispensable to rotate the winding member 8 in synchronization with a motion of the driving belt 3.

REFERENCE SIGNS LIST

1 HARNESS WIRING STRUCTURE
2 VEHICLE (BASE)
22 ROTATION DRIVING DEVICE (DRIVING MEMBER)
4 WIRE HARNESS
41 FOLDED PORTIONS (PORTIONS INSERTED IN WIRE HARNESS INSERTION PORTION)
5, 5A, 5B WIRE HARNESS WINDING DEVICE
6 DOOR ARM, SLIDE DOOR (SLIDE STRUCTURE)
7 FIXING MEMBER
8, 8A WINDING MEMBER
85 CIRCUMFERENTIAL SURFACE
82, 82A WIRE HARNESS INSERTION PORTION
10 HOUSING PORTION

What is claimed is:

1. A wire harness winding device comprising:
   a fixing member to which one ends of a plurality of wire harnesses are fixed; and
   a winding member of a tubular shape which is formed coaxially with the fixing member, and is able to wind the plurality of wire harnesses on a circumferential surface thereof,
   wherein the circumferential surface of the winding member is provided with a plurality of wire harness insertion portions at an interval in a circumferential direction,
   wherein the plurality of wire harnesses are individually inserted with an excess length into the plurality of wire harness insertion portions, and other ends of the plurality of wire harnesses are led out to an outside of the winding member, and
   wherein when the plurality of wire harnesses are at a first position of a winding position at which the plurality of wire harnesses are wound by the winding member and a leading position at which the plurality of wire harnesses are led from the winding member, a portion of the excess length is wound by the fixing member, and
   when the plurality of wire harnesses are at a second position of the winding position and the leading position, the portion of the excess length is slacked between the fixing member and the winding member.

2. The wire harness winding device according to claim 1, wherein when the plurality of wire harnesses move from the winding position to the leading position,
   the winding member rotates in a direction opposite to a winding direction in which the portion of the excess length is wound by the fixing member, and
   the portion of the excess length wound by the fixing member is slacked between the fixing member and the winding member.

3. The wire harness winding device according to claim 1, wherein when the plurality of wire harnesses move from the winding position to the leading position, the winding member rotates in a direction identical to a winding direction in which the portion of the excess length is wound by the fixing member, and the portion of the excess length slacked between the fixing member and the winding member is wound by the fixing member.

4. The wire harness winding device according to claim 1, further comprising a housing portion of a cylindrical shape which is vertically provided opposing to the circumferential surface and in which the plurality of wire harnesses is housed between the circumferential surface of the winding member and the housing portion, wherein the housing portion is provided at an interval from the wire harnesses wound in a slack state at an outermost side of the winding member when approximately half of lengths of the plurality of wire harnesses are wound by the winding member.

5. The wire harness winding device according to claim 1, wherein the plurality of wire harnesses are formed in a belt shape.

6. The wire harness winding device according to claim 1, wherein a portion of each of the plurality of wire harnesses which is inserted in the wire harness insertion portion is folded back, and the folded portion of each of the plurality of wire harnesses is movably provided in a circumferential direction of the circumferential surface.

7. The wire harness winding device according to claim 1, wherein, the plurality of wire harnesses are wired over a base and a slide structure which is slidably provided to the base, and the winding member rotates in synchronization with a motion of a driving member which slidably drives the slide structure to lead or wind the plurality of wire harnesses.

* * * * *